March 8, 1966    F. D. PETERSON    3,239,100
FOAM DEPOSITOR SYSTEM
Filed March 19, 1962    5 Sheets-Sheet 3

INVENTOR.
Fred D. Peterson
BY
Townsend and Townsend
attorneys

March 8, 1966  F. D. PETERSON  3,239,100
FOAM DEPOSITOR SYSTEM

Filed March 19, 1962  5 Sheets-Sheet 4

INVENTOR.
Fred D. Peterson
BY
Townsend and Townsend
attorneys

March 8, 1966   F. D. PETERSON   3,239,100
FOAM DEPOSITOR SYSTEM
Filed March 19, 1962   5 Sheets-Sheet 5

INVENTOR.
Fred D. Peterson
BY
Townsend and Townsend
attorneys

United States Patent Office 3,239,100
Patented Mar. 8, 1966

3,239,100
FOAM DEPOSITOR SYSTEM
Fred D. Peterson, San Mateo County, Calif., assignor to Peterson Products of San Mateo, Inc., Belmont, Calif.
Filed Mar. 19, 1962, Ser. No. 180,629
2 Claims. (Cl. 222—57)

This invention relates to a new and improved chemical foam depositor system and more particularly one having use wherein three ingredients (including a foaming agent) are pumped through a common dispensing head for deposit in a preselected location. In the form of the invention hereinafter described, the three ingredients comprise two resin components and a foaming agent such as bichlorodifluoromethane (Freon 12). The mixing of these three ingredients in accordance with the system hereinafter described dispenses a rigid polyether urethane (polyurethane) foam. It will be understood that the system has application to other products, preferably of the type wherein two ingredients are desirably mixed only immediately prior to dispensing and hence are maintained separated until they are mixed with one or both of the ingredients at approximately the time that the two components are themselves mixed together.

The present invention employs in its system three positive displacement proportioning pumps which are completely air operated, and are linked pneumatically, as hereinafter described in detail, in such manner as to insure that the three pumps operate synchronously. Accordingly, precise proportioning of the components and the Freon is obtained by means of convenient manual external adjustment of two of the pumps. Speed controls for the pumps are preferably installed at a master control console wherein valves are provided for independent regulation of the air pressure driving each of the three pumps, thereby compensating for variations in the relative viscosities of the three ingredients.

The system hereinafter described provides for adjustment of the quantity of discharge of foam, the proportioning of the ingredients relative to each other, and adjustment for viscosity of the ingredients.

The present invention comprises an air motor for one of the three pumps, namely the particular pump which must deliver the largest volume of the three ingredients. The valve control for the air motor is modified from conventional pump motors of this type in that the single valve is used to control the air supply for the air motors for all three pumps. By adjusting the air supply of the main pump, the rate of discharge of this pump may be controlled and such adjustment affects and regulates the discharge of the entire system. The other two pumps (slave pumps) are preferably regulated in length of stroke by manual adjustment. The system is so regulated that each pump makes the same number of strokes per time interval, and hence regulating the stroke of the two slave pumps which are driven synchronously with the main pump varies the proportion of the other two ingredients relative to the ingredients dispensed by the main pump. It will further be understood that the viscosity of the various ingredients may vary from time to time. Such variations may be partially cotrolled by heating the components to make them less viscous. However, the system also provides means for controlling the air pressure to the two slave pump motors in order to insure that the pump pistons of the three pumps move at approximately the same speed. If the three pumps are so regulated in their air supply that the pistons thereof move at the same speed, and since the number of strokes of the pumps is identical, the discharge of the three pumps brought together in the dispensing head will be of constant proportion and for practical purposes homogeneous.

A further feature of the invention is the fact that the pumps proportion accurately with all three of the components of the foam in phase.

A further feature and advantage of the invention is the fact that the pumps are preferably driven by compressed air from a conventional air compressor. Thus no high voltage alternating current electric motors are required in the system, as contrasted with proportioning systems wherein gear pumps driven by electric motors must be employed. The absence of high voltage current is a feature of particular advantage in that at intervals the equipment must be flushed out with a solvent and many commonly used solvents are explosive.

A further feature and advantage of the invention is the fact that the pumps are of positive displacement type and hence the quantity of foam dispensed for each stroke of the pump is uniform. By counting the strokes the amount of foam dispensed can be calculated with ease.

A still further feature and advantage of the invention is the low maintenance cost in that any of the positive displacement pumps can be repaired by merely replacing cylinder and packings with standard parts. This is of particular importance in that pumps used in systems handling this type of equipment tend to wear rapidly because of crystals from TDI, (toluene diisocyanate).

Another feature of one form of the invention is the fact that the pumps need not recirculate. Where electric motor driven pumps are employed, a relief valve must be provided for recirculation of the pump liquid back to its source to prevent stalling the motor. The present invention eliminates the need of recirculating the ingredients. Where heat transfer is a problem which might otherwise indicate that recirculation should be attempted, the thick walls of the hoses used in accordance with the present invention provide sufficient heat insulation so that recirculation is not necessary.

Still another feature of the invention is the fact that the ingredients are agitated immediaetly prior to and as they are being dispensed from the head in which they are mixed together. Premature mixing of the ingredients is avoided and hence an effective foam is produced.

The console and the air supply, which is distributed by means of manifolds at the console, may be used not only to drive an air turbine for the dispensing head and the pumps heretofore mentioned, but also various types of auxiliary equipment such as air masks for operators, air spraying apparatus, and a system for cleaning the apparatus by means of solvents.

A feature of the invention is its ready portability in that the console and the containers for the various ingredients may all be mounted on a cart supporting a mast and articulated booms for support and enclosure of material and control flow lines which lead to a dispensing head located at the outer end of the booms.

The dispensing head used in accordance with this system has a number of features and advantages. Essentially the head consists of a mixing chamber in which the three ingredients are brought together and agitated and from which they are discharged at a pressure at least as great as the vapor pressure of the foaming agent. The dispensing head is so constructed that back pressures are created throughout the chamber, thereby insuring proper mixing of the various ingredients.

A particular feature of the construction of the dispensing head is the means incorporated therein whereby the components are admitted to the mixing chamber and which insures proper mixing of the ingredients. Thus the foaming agent and the lighter of the two components are so directed into the mixing chamber that they first contact a rotating rod or shaft having a roughened or knurled surface, the surface friction of which blends the foaming agent and the first of the components together. The heavier component is preferably separately introduced to the mixture of lighter component and foaming agent. A further feature of the construction of the entrance end of the mixing chamber is the fact that an agitator is located at this zone, which agitator comprises a propeller constructed with a reverse thrust, the propeller preferably being shrouded along its outer tip so that the heavier ingredient will be directed back for recirculation through the propeller. Preferably the particular component having the thinnest viscosity and also preferably that not having TDI comes in contact with the propeller shaft along with the foaming agent (Freon). This results in a thorough mixing of the thinnest component and the foaming agent and the mixture of these two ingredients is then mixed with the thicker component. The three ingredients are thoroughly stirred by means of a series of turnstile-type stirring rods. A second propeller, which likewise has a reverse thrust, is located at the bottom of the agitator chamber, again insuring a back pressure which maintains the chamber filled at all times.

The mixing chamber is closed off at its lower end by means of a cap having its discharge orifice located displaced from the center of the cap. Hence the center of the cap may constitute the bottom bearing for the agitator shaft. A further feature of this construction is the fact that the fluid may constitute its own lubricant, lubricating the metal-to-metal contact.

The control handle which governs the delivery of components to the head is provided with a cam which controls an air valve supplying pilot air to shut off the pumps for the ingredients. The pumps serve as their own accumulators and when their strokes are discontinued they do not continue to pump against a static head. When the control handle is again turned on and the pumps resume operation, even the first material deposited is well mixed, as contrasted with other systems wherein the thin viscosity component tends to spurt out ahead of the other components.

Other features of the dispensing head relate to safety. Thus the dispensing head is held in assembled position by means of a yoke which has eye bolts, the eyes of which are not welded together. In the event of a build-up of pressure the eyes tend to open gradually and enable the caps at either end of the dispensing barrel to move apart relative to each other so that the components within the mixing chamber can escape without explosion.

A further feature of the construction is the fact that the caps are sealed to the barrel by means of O-rings seated in butt joints. Hence the ingredients tend to blow out sideward as contrasted with conventional means of sealing caps to opposite ends of a chamber barrel. Again, this construction reduces danger of explosion.

The foregoing construction likewise makes the assembly of the parts rapid and facilitates cleaning of the mechanism at the end of its use.

Still another feature of the invention is the fact that the Freon or foaming agent is emitted into the mixing chamber only when the pressure exceeds that of a check valve located below the mixing chamber. A positive pressure head is maintained on the top of the Freon tank by means of a nitrogen cylinder. The nitrogen is also available to fill the heads of the tanks for the other components.

Another advantage of the invention is the provision of means for flushing the dispensing or mixing head with solvent. A three-way valve is actuated manually to provide pressure in the tank for solvent.

A still further feature of the invention is the provision of a back pressure mechanism consisting of a tubular back pressure diaphragm located below the mixing chamber. The Freon or other foaming agent must be maintained at a pressure above about 80 p.s.i., its vapor pressure. The diaphragm insures that no product will be dispensed at a pressure below such pre-selected pressure. The back pressure mechanism is so constructed that it will only open and discharge foam when the pressure is above a predetermined amount, which amount is regulated by the valve. This insures that the mixed ingredients will be discharged in the form of a froth foam. An on-off operation is obtained with very little loss of product or spillage.

An advantage of the foregoing construction is that the flow is straight through when the mechanism is open rather than pursuing a circuitous path as in other pressure regulators. No seats are required for valves and leakage is for practical purposes eliminated. The device compensates for changes in volume and further is self-indicating as to whether the product is being discharged.

Below the back pressure regulator is an expansion chamber which collects the product discharged from the regulator and prevents the product from being emitted in a swirling fashion. This insures proper filling of a cavity, mold or the like with foam.

Other objects and advantages of the invention will become apparent upon reading the following specification and referring to the accompanying drawings in which similar characters of reference represent corresponding parts in the several views.

Figure 1:
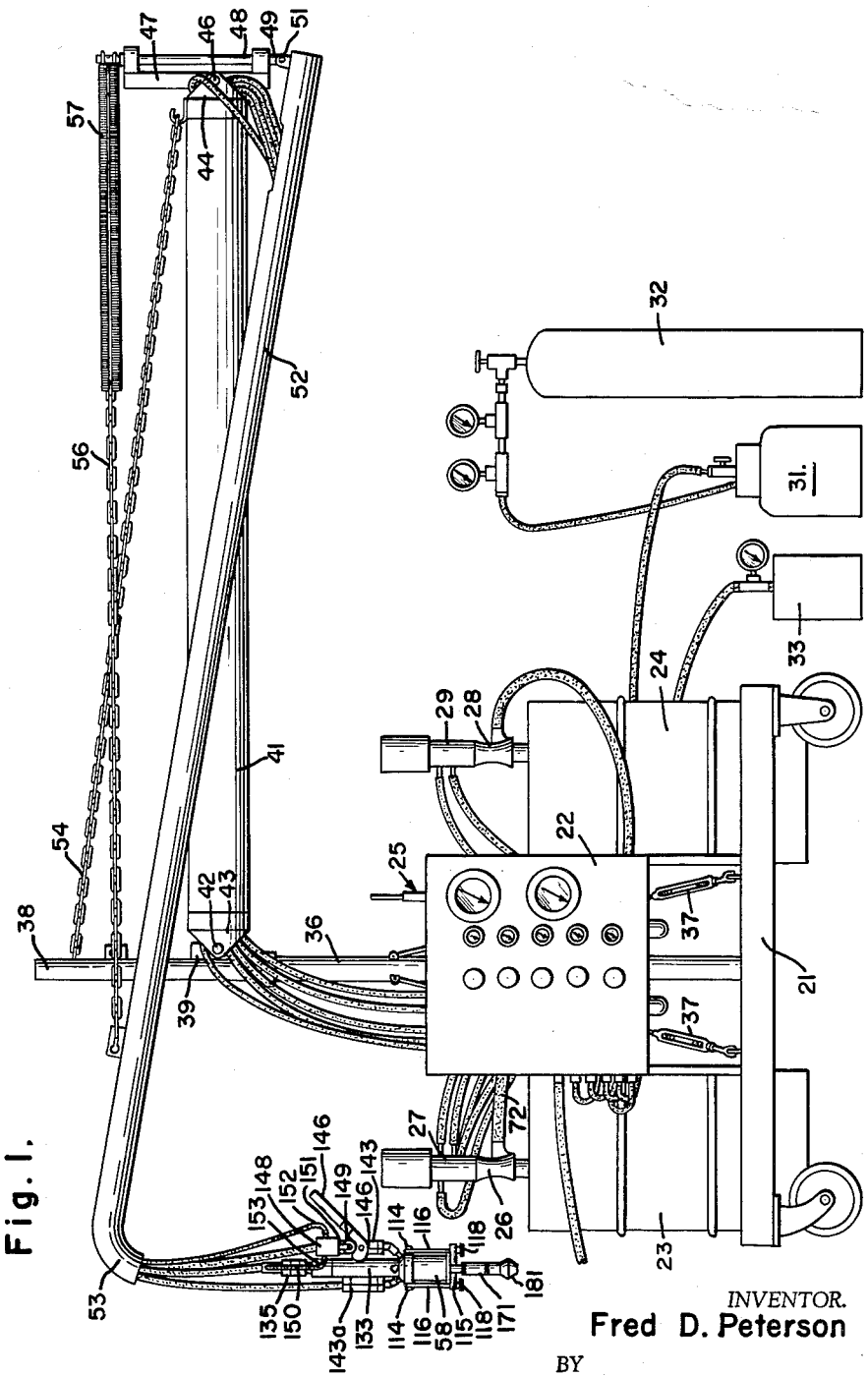
FIG. 1 is a substantially diagrammatic front elevational view of the components making up the system.

As best shown in FIG. 1 there is provided a carriage 21 in the form of a dolly on which many of the components hereinafter described are mounted and transported. Such a dolly is readily portable from job to job. Mounted on dolly 21 is console 22 containing various valves, gauges and the like hereinafter described in detail. For convenience, one of the adjustable stroke pumps, namely that pump 25 which emits Freon, may be mounted on console 22. Dolly 21 also carried two large drums, 23 and 24, containing component A and component B. Component A drum 23 is preferably that particular plastic ingredient which is consumed in the largest volume. Pump 26 for component A is of a fixed stroke and is driven by means of air motor 27. Air motor 27 and its valve construction are hereinafter described in greater detail. Component B drum 24 is likewise provided with pump 28 which is preferably adjustable in its stroke and is driven by its own air motor 29, likewise as hereinafter described. Dolly 21 may also be used to transport other equipment which is shown for convenience in FIG. 1 removed from the dolly but which in actual practice is preferably mounted thereon. Thus a cylinder 31 of liquified Freon gas is used. A second cylinder 32 of nitrogen gas used to fill the Freon cylinder head space may be used. Further a pot 33 of solvent for flushing out the mechanism may likewise be so mounted.

It will be understood that components A and B and Freon are used to produce a polyurethane foam for which the invention is particularly suitable. However, other ingredients may be used in the system, the system having wide flexibility of use.

Lower stanchion 36 is installed projecting vertically from the platform of dolly 21 and is supported by adjustable guy wires 37. An upper stanchion 38 is rotatable inside lower section 36 and carries a pad 39 from which extends hollow first boom 41 connected by means of horizontal swivel pin 42 to pad 39 by means of a clevis 43. The outer end of first boom 41 carries a second clevis 44 pinned by means of pin 46 to transverse yoke 47 in which is rotatable rod 48. One end of rod 48 is pinned by means of pin 49 to pad 51 on the inner end of hollow second boom 52 which has a curved outer end 53. Adjustable supporting wires 54 interconnect the outer end of first boom 41 with upper stanchion 38, and a second set of adjustable support wires 56 connects extension 57 on rod 48 with the outer end of the second boom 52. By adjustment of wires 54, 56, the angles of boom 41, 52, with respect to the horizontal and with respect to each other may be adjusted. Further, by swiveling upper stanchion 38 relative to lower stanchion 36 and rod 48 relative to yoke 47 the outer end 53 of the second boom 52 may be brought into alignment with a pan, mold, cavity or the like into which the product is to be dispensed. The various hoses for ingredients and certain air supply hoses are carried up from dolly 21 and particularly from console 22 through first boom 41 and thence through second boom 52 to dispensing head 58 depending from end 53. The dispensing head 58 hereinafter described in detail is attached to the ends of said hoses.

COMPONENT PUMPS

A preferred pumping system uses three pumps, namely a main pump 26 to pump component A used in greatest quantity, a first slave pump 28 to pump component B used in lesser quantity, and a second slave pump 25 to pump Freon or other gaseous foaming agent. The two slave pumps 25, 28, as hereinafter explained in detail, are preferably driven by means of the valve system for air motor 27 of master pump 26 and the two slave pumps are preferably individually variable in stroke.

Figure 3:
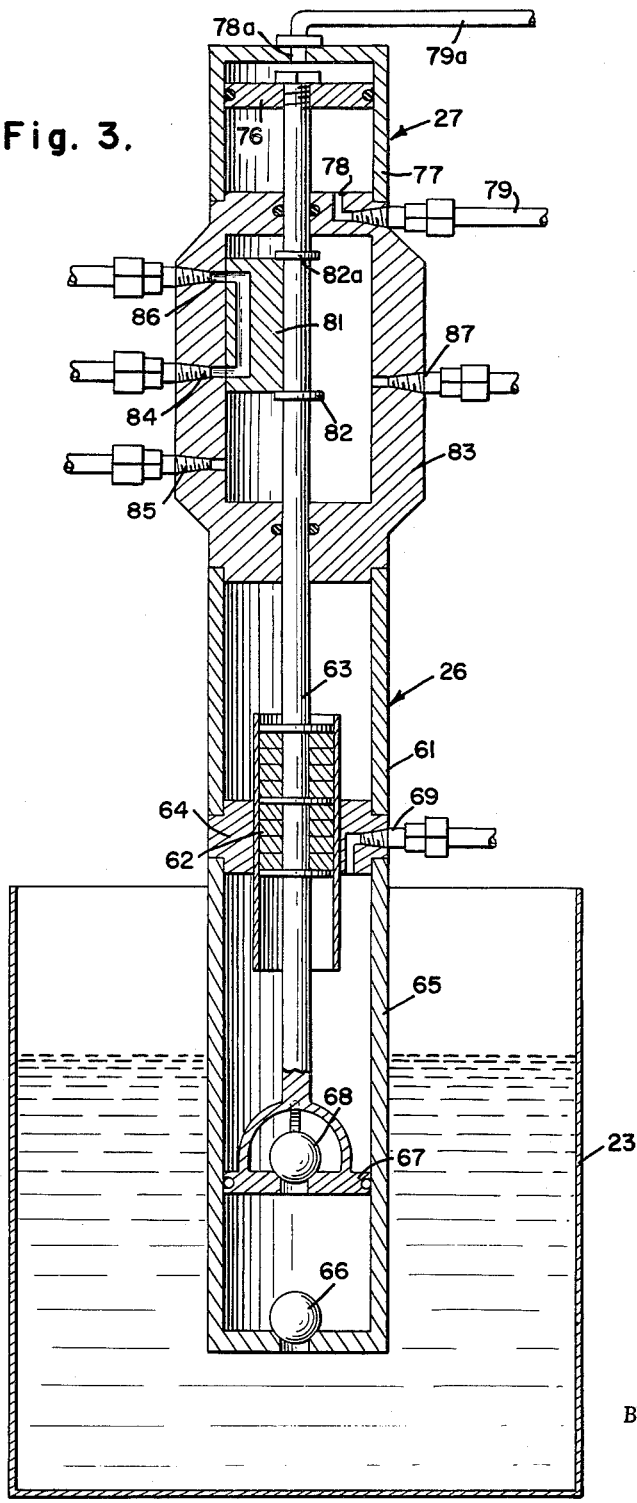
FIG. 3 is a longitudinal sectional view of the master pump, its air motor, valve construction and associated elements.

Master pump 26 is shown in FIG. 3. The pump itself is a double-acting piston type having a cylinder 61 in which reciprocates piston 62 mounted on rod 63. The lower end of cylinder 61 is closed by disc 64 through which piston 62 projects. Below disc 64 is pipe 65 extending to the bottom of drum 23. Check valve 66 is located at the bottom of pipe 65. Above valve 66 is a second piston 67 connected to the lower end of rod 63 to reciprocate inside pipe 65. Piston 67 has a second check valve 68. The discharge from pipe 65 is through port 69 in the upper end of pipe 65. Fluid is drawn into pipe 65 on the upstroke of pistons 62 and 67 and is also discharged through port 69, valve 68 being closed. On the downstroke of pistons 62 and 67, piston 62 displaces part of the volume below disc 64, and valve 68 is opened and valve 66 closed. Hence, fluid is discharged through port 69 on both the upstroke and downstroke of the pump.

The pump motor 27 is mounted above pump 26 and consists of a double-acting piston 76 reciprocable in cylinder 77, piston 76 being on the same shaft 63 as pump piston 62. Motor cylinder 77 is formed with ports 78, 78a, at opposite ends, ports 78, 78a, being connected by means of conduits 79 and 79a respectively to console 22. As air is admitted to opposite ports 79, 79a, pistons 76 and 62 are caused to reciprocate in their respective cylinders.

The valve system for air motor 27 is shown in simplified schematic form. The actual valve structure is of well-known toggle type which is commercially available. A D-type slide 81 is fixed by fittings 82, 82a, for reciprocation with rod 63 inside valve body 83. Valve body 83 is formed with three adjacent ports 84, 85, 86, the length of slide 81 being such as to establish communication between the center port 84 and either of the two end ports 85, 86. A fourth port 87 for exhaust is formed in valve body 83 and establishes communication and that particular end ports 85, 86, which is not at a particular time in communication with center port 84. Compressed air from console 22 is introduced at center port 84. The function of the motor valve is to reverse direction of air motor 27 as piston 62 reaches each end of its stroke. A feature of the invention is the fact that ports 85 and 86 of the valve body do not directly communicate with ports 78, 78a, of the air motor 27, but rather are connected by means of conduits 79, 79a, to console 22. The arrangement of the console 22, described in discussing the piping diagram FIG. 2 at a later section of this specification insures that valve 81 controls reciprocation of the air motors for main pump 26 and also for the two slave pumps 25, 28.

Figure 4:
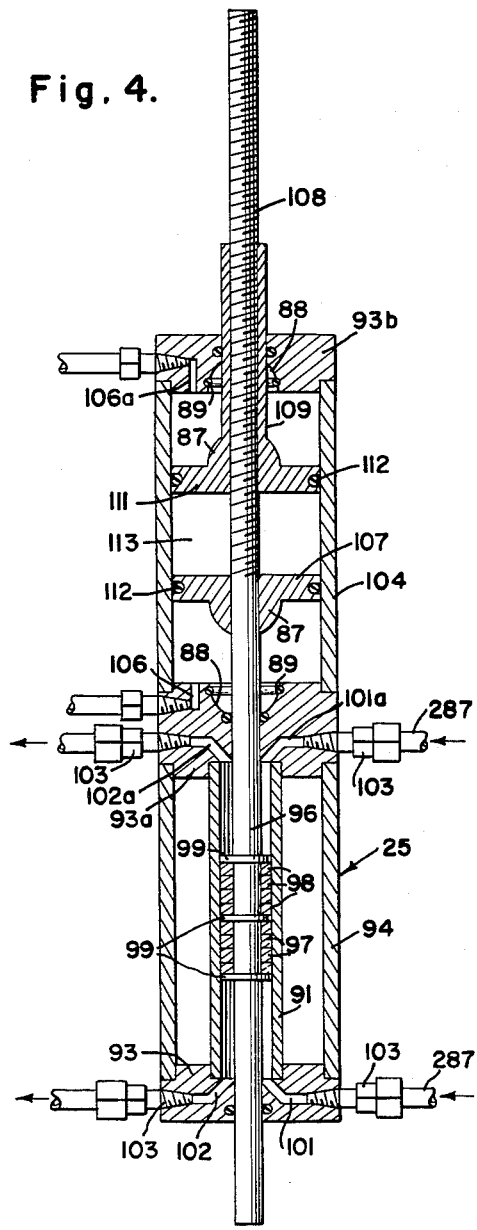
FIG. 4 is a longitudinal midsectional view through one of the adjustable stroke pumps and its air motor.

The two slave pumps 25, 28, are essentially the same in structure except for capacity and hence only one such pump 25 is illustrated in FIG. 4. Pump cylinder 91 comprises a tube, the opposite ends of which fit into end blocks 93, 93a, which are tied together by jacket 94. Pump rod 96 which extends through end blocks 93, 93a, carries piston 97 which in this case comprises plastic discs 98 held in place by a plurality of metal discs 99 fixed to rod 96. Inlet and outlet ports 101, 102, are formed in lower end disc 93 and inlet and outlet ports 101a, 102a, are formed in middle end block 93a. Check valves 103 are installed at each port 101, 102, so that the direction of flow is as shown by the arrows in FIG. 4.

Above middle end block 93a is motor cylinder 104 which carries at its upper end an upper end disc 93b. Lower air port 106 and upper air port 106a are formed in middle and upper end blocks 93a, 93b, respectively. A first piston 107 is fixed to rod 96. The upper end 108 of rod 96 is externally threaded and receives internally threaded sleeve 109 which carried upper piston section 111 at its lower end. Sleeve 109 extends externally of upper plug 93b. By turning rod 108 and sleeve 109 equal angular distances in opposite directions, the two pistons 107, 111, may be moved toward or away from each other. Since each piston has its own ring 112 which seals against cylinder 104, the space 113 between the pistons is for practical purposes dead. Accordingly the stroke of rod 96 may be adjusted by moving motor pistons 107, 111, toward and away from each other and this, in practical effect, adjusts the stroke of pump piston 97. The outer end of each piston 107, 111, is formed with a rounded nose 87 and discs 93a, 93b, with complementary recesses 88 in which seat O-rings 89. When piston 111, for example, approaches the end of the stroke, nose 87 seats on ring 89, forming an air cushion in recess 88 which cushions the shock of the piston hitting the end of the cylinder.

MIXING HEAD

Figure 5:
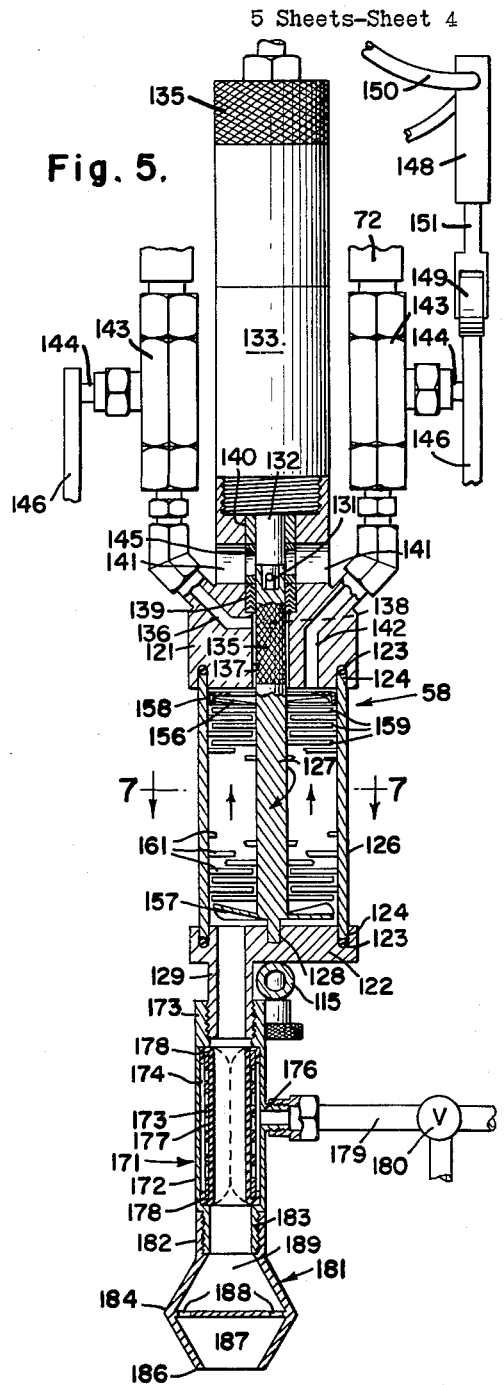
FIG. 5 is a longitudinal midsectional view through the dispensing head, back pressure regulator, and associated mechanism.

Mixing head 58 is shown in FIG. 5. There is provided an upper block 121 and a lower block 122 each formed with an annular groove 123 receiving an O-ring 124. The opposite ends of cylinder barrel 126 fit into grooves 123 with O-rings 124 interposed between the edges of the barrel 126 and the bottoms of the grooves. A pair of diametrically opposed studs 114 project from the periphery of upper block 121. Extending across the bottom of lower block 122 is a rod 115. A pair of eye bolts 116 fit around studs, 114, the eyes, 117 thereof, being open—i.e., not welded—so that excessive stress on bolts 116 causes the eyes to expand. The lower ends of bolts 116 extend through holes in rod 115 and are retained in place by means of nuts 118. When it is desired to disassemble head 58, nuts 118 are removed, thereby separating blocks 121, 122, and enabling the cylinder barrel 126 to be removed. If, as has been mentioned, the pressure inside cylinder 126 becomes excessive, the eyes 117 open until the blocks 121, 122, move apart a sufficient distance so that the contents of the head may escape around the edges of barrel 126. The butt joints provided by grooves 123 enable the fluid inside head 58 to escape without interference from O-rings 124, a particular feature and advantage of the invention which prevents head 58 from exploding under excessive pressure.

Extending through head 58 is mixer shaft 127. The lower end 128 of shaft 127 is necked and is received in a bore in lower block 122, it being noted that the discharge nipple 129 of block 122 is off-center, thereby enabling block 122 to serve as a lower bearing for shaft 127. The upper end of shaft 127 extends through block 121 and is connected by means of coupling 131 to the shaft 132 of conventional air turbine 133 carried on the upper end of block 121. The arrangement heretofore described does not require external lubrication, in that the fluids dispensed through the mixing head provide their own lubrication for the metal-to-metal bearings. Turbine 133 is driven by compressed air and has a manual valve 135 controlling turbine 133.

Upper head 121 has three inlet ports for the three components being mixed. The port 136 for the thinner viscosity component is directed radially inwardly toward shaft 127, the bore 137 of head 121 being greater than the diameter of shaft 127 to provide an annular space down which the component flows from port 136. Similarly the liquified Freon port 138 is radially disposed at about the level of component B port 136. Shaft 127 is roughened or knurled in the extension 135 which fits into bore 137 so that the Freon and thinner component are at least partially mixed together as soon as they are received in the mixing head 58. An annular chevron packing seal 139 is recessed into the upper end of head 121 and seals against shaft 127. Radial openings 141 are provided above seal 139 so that if component leaks out through seal 139 it escapes through openings 141.

The thicker viscosity component is introduced into mixing head 121 through port 142 which enters the mixing chamber in an axial direction spaced radially outwardly from the center of shaft 127.

Above ports 136, 142, are plug valves 143, of conventional type, the stems 144 of the valves being diametrically opposed. A single actuating handle 146 is provided controlling both valves 143 so that the two components are turned on and off simultaneously. One of the valve stems 146 carries a cam 147. Pilot air valve body 148 is positioned in proximity to cam 147 and has a cam follower 149 on its stem 151. When the handle 146 is turned to open the valve the compressed air valve 148 is switched from one outlet to another. Valve inlet 152 is connected by hose 150 to the source of compressed air for driving mixing head turbine 133. Valve 148 is connected by hoses to console 22 and is used as pilot air to control the actuation of valves for all pump air motors for the ingredients. This prevents back-pressure from building up in the hoses leading to the component valves 143 at the dispensing head. Passageway 138 connects with valve body 143a having branch 153 connected to a source of Freon at console 22. Valve handle 154 on body 152 is used to connect passage 138 with solvent flush pot 33 when it is necessary to clean the equipment.

Figure 6:
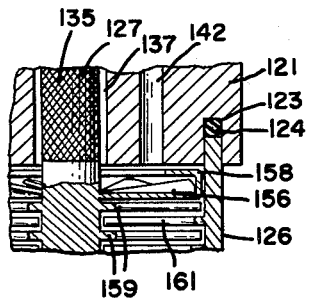
FIG. 6 is a fragmentary, enlarged sectional view of the upper end of the dispensing head.
Figure 7:
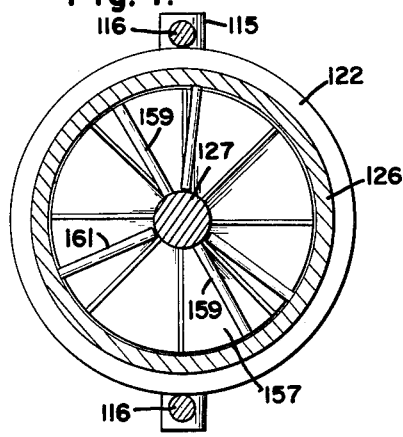
FIG. 7 is a transverse sectional view taken substantially along line 7—7 of FIG. 5.
Figure 8:
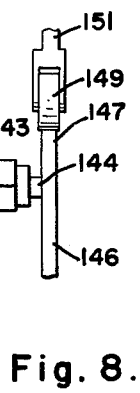
FIG. 8 is a side elevation of the structure of FIG. 5.

The mixing head body 126 contains agitator propellers 156, 157, at either end of cylinder 126 mounted on shaft 127, the blades of propellers 156, 157, being pitched so as to create upward motion of the fluid in a direction counter to downward flow through head 58. Counter flow insures thorough mixing of the ingredients. Further, an annular shroud 158 is formed around the periphery of upper propeller 156. The cross section of the shroud 158 as shown in FIG. 6 is such that liquid is directed upward and radially inward by the shroud, thereby causing recirculation of the heavier component to augment mixing of the components together. It will be understood that the Freon is heavier than the other components and hence by reason of centrifugal force tends to move toward the cylinder wall 126 and might, were it not for means herein provided, run down the cylinder wall without proper mixing with the other components. Shroud 158 tends to direct the Freon back toward the shaft 127 for recirculation.

Shaft 127 carries a number of radially extending pins 159 and radially inward extending pins 161 are formed on the interior wall of cylinder 126, the various pins 159, 161, resembling a turnstile. The pins insure thorough mixing of the components as they move from the top to the bottom of cylinder 126 and are discharged through discharge orifice 129.

BACK PRESSURE VALVE

Immediately below mixing head 58 is back pressure valve 171. It will be understood that a foaming agent such as Freon 12 must be maintained above its vapor pressure up to the time of being dispensed or the discharge will not be a froth foam. To insure this result, back pressure valve 171 is preferably installed below the mixing head 58 in such fashion that no fluid is discharged from the mixing head at a pressure below a preselected pressure, which for practical purposes should be about 80 p.s.i. for Freon 12. Valve 171 is contained in outer tubular casing 172 threaded at either end, the upper end 173 being threaded to the discharge nipple 129 of mixing head 58. A tubular perforated support 173 is positioned inside casing 172 with an annular space 174 between the two cylindrical members. A compressed air inlet 176 is installed in valve casing 172 and communicates with annular space 174. Immediately inside tubular support 173 is a resilient tubular diaphragm 177 which is normally straight and open at either end. The ends 178 of diaphragm 177 are folded over to the outside of tubular support 177 and are jammed between the opposite ends of casing 172 and the end edges of support 173. Diaphragm 177 is preferably fabricated of rubber hose reinforced with a breaker strip of cloth, which cloth is cut on the bias. When compressed air is supplied to inlet 176 through hose 179 diaphragm 177 tends to contract from the solid line position shown in FIG. 5 to the dotted line position thereby closing the passageway through valve 171. However, the pressure of the fluid attempting to flow through the valve when it overcomes the pressure of the compressed air restores diaphragm 177 to solid line position and permits the emission of fluid discharged from mixing head 58, which pressure is in all instances not less than the pressure of the incoming compressed air. Air is controlled by valve 180 to a source of compressed air or exhausted to atmosphere.

EXPANSION CHAMBER

Below back pressure valve 171 is expansion chamber 181 which comprises a coupling 182 screwed onto the lower end 183 of valve body 171 which flares out to an increased diameter 184 and thence contracts to a diameter 186 approximately equal to that at the entrance. End 183 is threaded to receive coupling 182 or an adapter for a hose to direct the fluid to a point of discharge. An apertured plate 187 is interposed transversely across expansion chamber 181 housing at its point 184 of maximum diameter, the apertures 188 in plate 187 being located adjacent the periphery thereof. The cavity 189 above plate 187 tends to collect the foam forming upon discharge from back pressure valve 171 and emits the foam in a relatively straight line flow through aperture 186, thereby eliminating swirling or snarling of the discharge stream which might otherwise result.

PIPING SYSTEM

Figure 2:
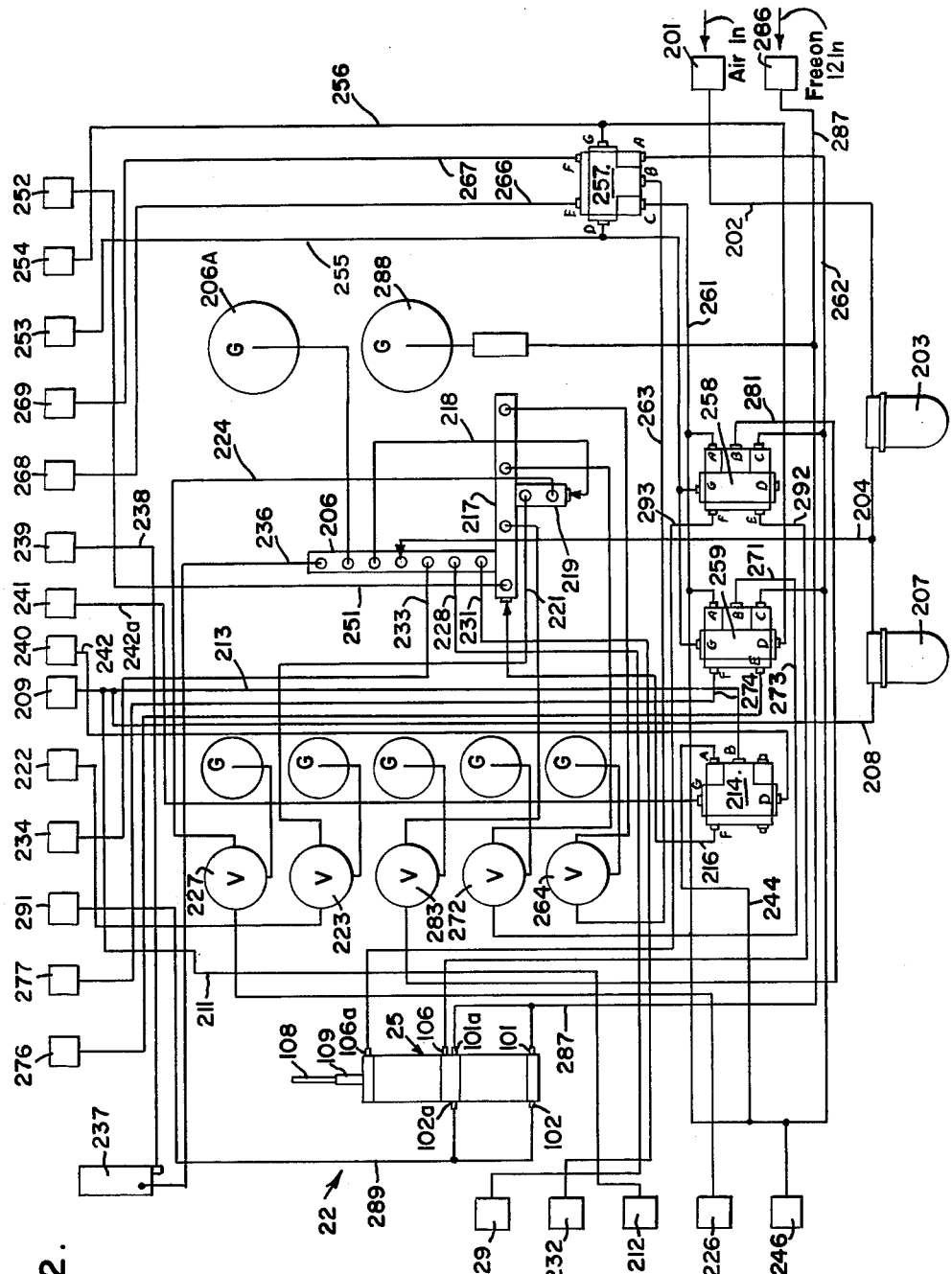
FIG. 2 is a schematic piping diagram for the system, tubular members being illustrated by single lines.

A convenient piping system installed in console 22 is shown in FIG. 2. A source of compressed air such as a portable air compressor or compressed air tank is connected to inlet 201 at console 22 and is directed by means of conduit 202 to a water trap 203 and thence by means of conduit 204 to first compressed air manifold 206, the pressure of which is indicated by gauge 206A. A portion of the compressed air may be diverted through oiler 207 and thence by means of conduit 208 to outlet 209 on console 22, thus providing a convenient source of oiled air for auxiliary equipment. Part of the oiled air in conduit 208 is diverted by conduit 211 to secondary outlet 212. Another part of the oiled air passes through conduit 213 to port B of valve 214 and by conduit 216 from port 214F to oiled air manifold 217, valve 214 being controlled as hereinafter described. A portion of the air in manifold 206 is conducted by conduit 218 to secondary manifold 219. Auxiliary air fans for spray equipment may be connected into manifold 217, thus line 221 for "fan" air outlet 222 may be controlled by means of valve 223 which is a manually adjustable pressure regulating valve. Similarly conduit 224 leads from manifold 219 to outlet 226 and valve 227 controls air pressure at outlet 226. Air for air masks leads from manifold 206 through conduit 228, to outlet 229 and conduit 231 leads to a second mask air outlet 232. Air for flush pot 33 is transmitted from manifold 206 by conduit 233 to outlet 234. Air turbine 133 on mixing head 58 is supplied by means of conduit 236 from manifold 206 through air regulator 237 and conduit 238 and thence to outlet 239 whence it is conducted by means of a suitable hose through booms 41 and 52 to air turbine 133 and its manual valve 135. This air also supplies pilot valve 148 and inlet 176 of back pressure valve 171.

The pumping system is largely controlled from the console pneumatic system. Pilot air from air valve 148 on mixing head 58 enters console 22 through inlet 240 or inlet 241, depending on the setting of valve 148, and is transmitted by conduits 242 and 242a to the D and G ports of valve 214, respectively. The setting of valve 148 controls the movement of the valve spool in valve 214. The B port of valve 214 is connected by conduit 213 to the source of oiled compressed air, as has been explained. The A port is connected by conduit 244 to exhaust air terminal 246. The F, or discharge port, of valve 214 is connected by means of conduit 216 to oiled air manifold 217. Thus valve 148 controls oiled air pressure or exhaust in manifold 217.

Oiled compressed air is directed from manifold 217 by conduit 251 to outlet 252 which is connected by a hose (not shown) to middle valve port 84 of valve body 83 for air motor 27 of the main or master pump 26. The return lines from the two end valve ports 85, 86, of valve 83, terminate at terminals 253, 254, respectively, of console 22 and are connected thence by means of conduits 255, 256, to the D and G ports respectively, of valve 257 and also to the D and G ports of valves 258 and 259. The D and G ports of the respective valves control movements of the spools within said valves. The A and C ports of valves 257, 258, and 259 are connected by conduits 261, 262, to exhaust terminal 246. The air supply for the center port B of valve 257 is connected by conduit 263 to oiled air manifold 217 with pressure regulating valve 264 interposed. The E and F ports of valve 257 lead respectively by means of conduits 266 and 267 to console outlets 268 and 269, respectively, which are connected by means of 79, 79a hoses to the master pump air motor ports 78, 78a. Hence, the air supply from the master pump air motor valve ports 85 and 86 which enters console 22 through connections 253 and 254 controls the air supply to motor 27.

The B port, or air inlet port of valve 259, is connected by means of conduit 271 to oiled air manifold 217 with pressure regulating valve 272 interposed. Thus valve 272 controls the pressure into valve 259. The E and F ports of valve 259 are connected by conduits 273, 274, to slave pump terminals 276, 277, which are connected by hoses to the air motor ports 106, 106a, for slave pump 28.

The air inlet or B port of valve 258 is connected by conduit 281 to valve 283 and thence to oiled air manifold 217. By adjustment of valve 283 the pressure of air to Freon pump 25 is controlled. Freon pump 25 may be installed on console 22. The Freon supply is connected through connection 286 on the console and thence by means of conduit 287 to ports 101 and 101a of Freon pump 25. Guage 288 mounted on console 22 is connected into conduit 287 and shows the Freon pressure. The Freon discharge from pump ports 102 and 102a is connected by conduit 289 to Freon discharge terminal 291 and is then connected by a suitable hose to mixing head port 138.

Valve 258 controls Freon pump 25. Its E and F ports are connected by conduits 292 and 293 to ports 106 and 106a respectively of the air motor for Freon pump 25.

Although I have described the present invention in some detail for purposes of illustration and example, it is understood that various changes and modifications may be practiced within the spirit of the invention and scope of the appended claims.

What is claimed is:

1. A foam depositor system comprising a first container for a first component, a first positive displacement pump for pumping first component from said first container, a first master fluid motor for driving said first pump, first valve means responsive to actuation of said first pump, a second container for a second component, second positive displacement pump for pumping second component from said second container, a second slave fluid motor for driving said second pump, a third container for a third component, a third positive displacement pump for pumping third component from said third container, a third slave fluid motor for driving said third pump, a source of fluid under pressure, means for directing fluid under pressure to said first master fluid motor, control means responsive to said first valve means for driving said fluid motors substantially synchronously from said source of fluid under pressure, means for independently regulating the fluid under pressure to each of said second and third slave fluid motors for maintaining the speed of said motors the same thereby compensating for variation in the relative viscosities of said components, a dispending head, conduit means for transmitting components from each of said pumps to said dispensing head and maintaining said components separating prior to reaching said dispensing head, a back pressure valve controlling discharge from said dispensing head, adjustment means for said back pressure valve whereby components are discharged from said dispensing head only when the pressure of said component exceeds a predetermined pressure at said back pressure valve, mixing means in said dispensing head thoroughly mixing said components together under pressure, and means for varying the stroke of each of said second and third slave fluid motors thereby to vary the respective proportion of said second and third components transmitted to said dispensing head relative to first component transmitted from said first pump.

2. A foam depositor system comprising a first container for a first component, a first pump for pumping first component from said first conductor, a first fluid motor for driving said first pump, first valve means responsive to actuation of said first pump, a second container for a second component, a second pump for pumping second component from said second container, a second fluid motor for driving said second pump, a third container for a third component, a third pump for pumping third component from said third container, a third fluid motor for driving said third pump, a source of fluid under pressure, control means responsive to said first valve means for driving each of said fluid motors substantially synchronously from said source of fluid under pressure, a dispensing head, conduit means for transmitting components from each of said pumps to said dispensing head and maintaining said components separated prior to reaching said dispensing head, mixing means in said dispensing head for mixing said components together, and second valve means interposed between said control means and at least one of said air motors for adjusting the speed of said last-named air motor without affecting the volume of discharge of said last-named air motor and without affecting the speed of the other said air motor.

(References on following page)

References Cited by the Examiner

UNITED STATES PATENTS

| | | | |
|---|---|---|---|
| 1,590,578 | 6/1926 | Harris et al. | 222—145 |
| 2,073,779 | 3/1937 | Bramsen | 239—304 X |
| 2,633,154 | 3/1953 | Eastman | 251—5 |
| 2,746,641 | 5/1956 | King | 222—132 X |
| 2,762,652 | 9/1956 | Carter | 239—303 X |
| 2,862,765 | 12/1958 | Wing | 239—303 X |
| 2,895,644 | 7/1959 | Pande | 222—134 |
| 2,946,488 | 7/1960 | Kraft | 222—334 X |
| 2,982,511 | 5/1961 | Connor | 251—5 |
| 3,011,444 | 12/1961 | Hobson | 103—6 |
| 3,013,497 | 12/1961 | Schneider | 103—6 |
| 3,035,775 | 5/1962 | Edwards et al. | 239—142 |
| 3,036,741 | 5/1963 | Hilts | 222—148 |
| 3,049,267 | 8/1962 | Edwards et al. | 222—134 |
| 3,071,293 | 1/1963 | Lewis-Smith et al. | 222—334 X |
| 3,134,508 | 5/1964 | Bayer et al. | 222—135 |
| 3,146,950 | 9/1964 | Lancaster | 239—428 X |

RAPHAEL M. LUPO, *Primary Examiner.*

LOUIS J. DEMBO, *Examiner.*